MODULATION SYSTEM FOR COLOR PHASE ALTERNATION
Filed Jan. 14, 1952
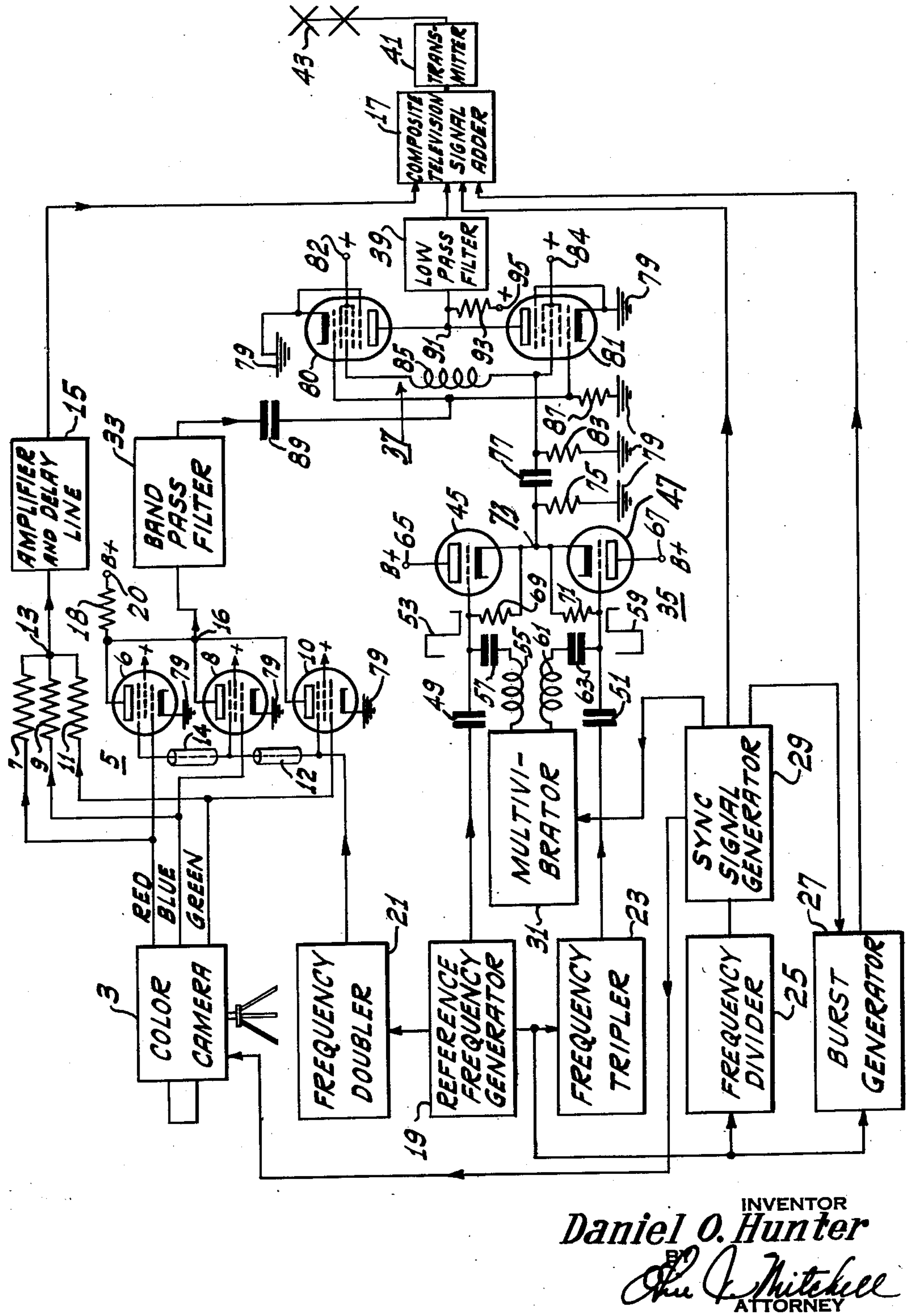
INVENTOR
Daniel O. Hunter
BY
[signature]
ATTORNEY 2,793,348
Patented May 21, 1957

2,793,348

MODULATION SYSTEM FOR COLOR PHASE ALTERNATION

Daniel O. Hunter, Princeton, N. J., assignor to Radio Corporation of America, a corporation of Delaware Application January 14, 1952, Serial No. 266,266
5 Claims. (Cl. 332—40)

This invention relates to color television systems, and more particularly to an improved method and apparatus for modulating a carrier wave with color information.

In a color television system, the brightness detail may be transmitted substantially in the manner customary for black and white television transmission, and the hue and chroma detail may be transmitted by phase and amplitude modulating a sub-carrier wave. While amplitude modulation of a carrier wave will produce identical information in the sidebands occurring on both sides of the carrier wave, it is well known that the phase modulation of such a carrier wave will not result in sidebands bearing identical information on both sides of the carrier wave. In a color television system in order to reduce interference or cross talk between the color information transmitted by the sub-carrier and the brightness information transmitted by the main carrier, it is desirable to choose a sub-carrier frequency which is separated from the main carrier as far as the bandwidth of the video signal channel will permit. In the case where this channel width is approximately 4 megacycles, a convenient reference frequency is approximately 3.89 megacycles. However, when the sub-carrier frequency is chosen to be near the upper limit of the bandwidth of the video signal channel, the portion of the color information appearing above the nominal frequency of the sub-carrier wave, i. e. in the upper sideband, is beyond the pass band of the channel and is not transmitted.

To make available the color information occurring on each side of the sub-carrier wave, it has been proposed to periodically reverse the sense in which the color video signals modulate the sub-carrier wave. By this means, all, or substantially all, of the color information of the subject is transmitted in the lower sideband of the sub-carrier wave at least half of the time. One such system forms the subject matter of a co-pending application by George C. Sziklai, Alfred C. Schroeder, and Alda V. Bedford, Serial Number 220,622, filed April 12, 1951, entitled "Multiplex Signalling Systems."

Recently proposed standards for terminology in the color television art term this method of transmission "Color Phase Alternation" abbreviated "CPA." Although various other terminology has been used, as for example, video signal sampling order reversal, reverse order sampling, and oscillating color sequence, the proposed term color phase alternation will be used throughout this specification and claims. Therefore, as used herein, color phase alternation will be synonymous with the terminology noted above.

One method which has been used to accomplish modulation of the sub-carrier is to amplitude modulate each of a plurality of waves of the frequency of the sub-carrier with information representative of a particular color. Each of the plurality of waves to be modulated is made to differ from the others by a fixed phase. The resulting separately amplitude signal modulated waves are then added to provide the phase and amplitude modulated sub-carrier signal.

A consideration of the operation of the modulators shows that previously it has been necessary to use either balanced or quasi-balanced modulators if the color information is to exceed a bandwidth of one half of the frequency of the sub-carrier. For example, when two signals of different frequencies are fed to an unbalanced modulator, it is well known that the output from the modulator will contain each of the original signals fed to the modulator in an amplified version, the sum of the frequencies fed to the modulator, and the difference between the frequencies fed to the modulator. In a color television system using a sub-carrier to transmit color information, the appearance of the original color information in the output of the modulator would cause interference, or cross talk, with the brightness information. However, if the bandwidth of the color information is restricted to one half the frequency of the sub-carrier, a filter may be designed to separate out the original color information appearing in the output of the modulators. However, it will be recognized that a sharp cutoff filter presents design difficulties.

An object of this invention is to provide an improved method for producing color phase alternation in a color televsion system employing a sub-carrier wave.

It is another object of the present invention to provide an improved apparatus for effecting color phase alternation.

Another object of the present invention is to provide an improved system of modulating a sub-carrier wave with color information.

A still further object of the present invention is to provide an improved method and apparatus for modulating a color sub-carrier wave in which the bandwidth of the color information is not restricted.

According to this invention, a wave having a frequency equal to $(n)f$ is modulated in accordance with color information, and the resulting signal modulated wave is heterodyned alternately with a wave having a frequency equal to $(n+1)f$ and with a wave having a frequency equal to $(n-1)f$, where $n$ equals any integer greater than 1, and $f$ equals any desired frequency such as a sub-carrier frequency. When the signal modulated wave is heterodyned with the wave having a frequency equal to $(n-1)f$, the heterodyne wave produced by the difference between the waves will have a frequency equal to $f$, and will be modulated in accordance with the color information. Information contained in the upper sideband of the signal modulated wave will then occur in the upper sideband of the resulting modulated wave having a frequency equal to $f$. In like manner, the information occurring in the lower sideband of the signal modulated wave will appear in the lower sideband of the modulated wave having a frequency equal to $f$. However, when the signal modulated wave is heterodyned with the wave having a frequency equal to $(n+1)f$, the information occurring in the upper sideband of the signal modulated wave will be in the lower sideband of the resulting modulated wave having a frequency equal to $f$ produced by the difference between the wave having a frequency equal to $(n+1)f$ and the signal modulated wave. Also, in like manner, the information occurring in the lower sideband of the signal modulated wave will appear in the upper sideband of the resulting modulated wave having a frequency equal to $f$. Thus the sidebands are reversed, and color phase alternation is provided, by switching the heterodyning wave from a frequency of $(n-1)f$ to a frequency of $(n+1)f$.

Other and incidental objects of this invention will become apparent upon a reading of the following specification and an inspection of the drawing in which:

The single figure is a combination block and circuit diagram of a color television transmission system including an illustrative embodiment of the present invention.

The video signal generating apparatus may be a color camera 3, adapted to provide three separate signals representative of the red, the blue, and the green color components of an image. The apparatus also includes three connections from the color camera 3 to a color modulator designated generally by the numeral 5. Each of these connections may be termed a color channel, and they have been marked in the drawing to denote their respective colors. The three color channels are also connected through resistances 7, 9, and 11 to a common connection 13, and the common connection 13 is connected to an amplifier and a delay line 15. The output of the amplifier and delay line 15 is connected to a composite television signal adder 17. This delay line may be of suitable value to provide the proper phase relationship between the brightness information and the color information at the composite television signal adder 17.

A reference frequency generator 19 generates a wave of a desired frequency which may be a sub-carrier frequency. Any of the common types of oscillators may be used as the reference frequency generator 19, such as a crystal oscillator, for example. As mentioned above, this frequency may be equal to one of the higher frequencies capable of being transmitted over the communication channel. In this illustrative embodiment, the output of the reference frequency generator is connected to a frequency doubler 21, and the double reference frequency output of the frequency doubler is applied to the color modulator 5. Also, in this embodiment the output of the reference frequency generator 19 is also connected to a frequency tripler 23, a frequency divider 25, and a burst generator 27. In a conventional manner the frequency divider 25 supplies a wave of suitable frequency to the sync signal generator 29, and the sync signal generator supplies suitable synchronizing pulses to the composite television signal adder 17, and to the color camera 3.

The sync signal generator is also connected to a burst generator 27 and to a multi-vibrator 31. The burst generator 27 supplies "burst," i. e. color synchronizing signals to the composite television signal adder 17. Descriptions of a suitable burst generator may be found in an article entitled "Recent developments in color synchronization in the RCA color television system" published by the Radio Corporation of America in February 1950, and also in the United States patent application by A. V. Bedford, Serial Number 143,800, filed February 11, 1950, and entitled "Synchronizing Apparatus."

The output of the color modulator 5 is applied to a band-pass filter 33 which is adapted to pass only the desired double frequency modulated signal. The output of the multi-vibrator 31 drives an electronic switch, the circuit of which is shown in detail, but which is designated generally by the numeral 35. The modulated signal passed by the bandpass filter 33 is applied to a heterodyne mixer, the circuit of which is also shown in detail, but which is designated generally by the numeral 37. The circuit details of the color modulator 5, the electronic switch 35, and the heterodyne mixer 37 will be described later.

The output of the heterodyne mixer 37 is connected to the composite television signal adder 17 through a low pass filter 39. The output of the composite television signal adder 17 is applied to a conventional television transmitter 41, the output of which is adapted to transmit television signals by means of antenna 43.

Without considering the circuitry of the color modulator 5, the electronic switch 35, and the heterodyne mixer 37, the operation of the illustrative television transmission system will be described.

The color modulator 5 modulates the wave of double reference frequency provided by the frequency doubler 21 in accordance with the color information from color camera 3. The output of the color modulator 5, therefore, is a wave of twice the reference frequency modulated in accordance with suitable color information. This wave is bandpassed by a bandpass filter 33 which is of a suitable design to eliminate the unwanted byproducts of modulation. Thus, only the double reference frequency modulated wave with its associated sidebands is applied to heterodyne mixer 37. The multi-vibrator 31 energizes the electronic switch 35 in such a manner that the output of the electronic switch 35 alternates between the reference frequency wave generated by the reference frequency generator 19 and the triple frequency wave from frequency tripler 23. Thus, the action of the electronic switch 35 is to feed to the heterodyne mixer 37, alternately a wave of reference frequency and a wave of three times reference frequency.

It will be recognized that the output of heterodyne mixer 37 will contain both a wave having a frequency equal to the sum of the frequencies fed to heterodyne mixer 37 and a wave having a frequency equal to the difference between the frequencies fed to the heterodyne mixer 37. This is the well known "beat frequency" phenomenon. However, since the low pass filter 39 is designed to pass only waves in the band of frequencies up to, and including the reference frequency, only the modulated reference frequency wave will be applied to the composite television signal adder 17.

When the electronic switch 35 is supplying a wave of reference frequency to the heterodyne mixer 37, the heterodyne wave produced by the difference between the signal modulated double reference frequency wave and the reference frequency wave will be passed by the low pass filter 39. However, when the electronic switch is supplying a wave of three times reference frequency to the heterodyne mixer 37, the wave applied to the composite television signal adder 17 through the low pass filter 39 will have a frequency which is equal to the difference between the wave of three times reference frequency and the signal modulated double frequency wave. In both cases, the wave passed by the low pass filter 39 will have a frequency nominally equal to reference frequency and will be modulated in accordance with the color information carried by the signal modulated double frequency wave. However, when the heterodyning wave has a frequency equal to three times reference frequency, the sidebands will be reversed with respect to the position they bore when the heterodyning wave had a frequency equal to reference frequency. For example, if a component of the signal modulated double frequency wave is 100 kc. above double reference frequency when the heterodyning wave has a frequency equal to reference frequency, the resulting wave will have a component 100 kc. above the nominal reference frequency too. However, when the heterodyning wave has a frequency equal to triple reference frequency, it is the wave having a frequency equal to the difference between the triple reference frequency wave and the modulated double frequency wave which is passed by the low pass filter 39. Thus, in the second condition, a signal component 100 kc. above the double reference frequency modulated wave will appear 100 kc. below the nominal reference frequency.

Although it will be recognized that any suitable type of color modulator, electronic switch, or heterodyne mixer may be incorporated in the present invention, specific circuit details for one suitable color modulator 5, one suitable electronic switch 35, and one suitable heterodyne mixer 37 have been included in the illustrative embodiment shown in the drawing.

The color modulator 5 uses three electron tubes designated by the numerals 6, 8, and 10. The previously mentioned frequency doubler 21 supplies the double frequency wave to be modulated. This wave is applied directly to the suppressor grid of the electron tube 10. This double reference frequency wave is also applied to the suppressor grid of electron tube 8 through a delay line 12, and to the suppressor grid of electron tube 6 through an additional delay line 14. For the sake of making a concrete illustrative disclosure of the invention, these delay lines have been chosen so that the wave applied to the suppressor grid of electron tube 8, is 120° out of phase with respect to the wave applied to the suppressor grid of the electron tube 10, and so that the wave applied to the suppressor grid of electron tube 6, is 240° out of phase with respect to the wave applied to the suppressor grid of electron tube 10. It is to be emphasized that these phase differentials may well be of different values without departing from the spirit of the present invention.

The three color component signals provided by the color camera 3 are applied to the control electrodes of electron tubes 6, 8, and 10 respectively. Thus, the red channel is connected to the control electrode of electron tube 6, the blue channel is connected to the control electrode of the electron tube 8, and the green channel is connected to the control electrode of electron tube 10. The cathodes of the three electron tubes 6, 8, and 10 are connected to ground reference potential 79, and the screen grids of these electron tubes 6, 8, and 10 are connected to a suitable source of positive potential. The anodes of the three electron tubes 6, 8, and 10 are connected to a common connection 16, and a common load resistance 18 is connected between this common connection 16 and a terminal 20, which is adapted to be connected to a suitable source of positive potential. The action of the color modulator 5, is to supply to the bandpass filter 33 a phase and amplitude modulated wave of double the reference frequency, by adding three waves of different phases, each of which is modulated in accordance with color information from one of the three color channels connected to color camera 3. It is to be understood that the particular form of color modulator included here is merely a portion of an illustrative embodiment of the present invention. Any equivalent apparatus providing an output of double reference frequency, modulated in accordance with color information, might be used.

The electronic switch 35 includes two electron tubes 45 and 47. Both of these tubes may be of the triode variety, each including a cathode, a control electrode, and an anode. One output of the reference frequency generator 19 is connected to the control electrode of electron tube 45 through a capacitance 49. In like manner, the output of the frequency tripler 23 is connected to the control electrode of the electron tube 47 through a capacitance 51. The multi-vibrator 31 acts as the control means for the electronic switch 35, and provides a voltage waveform 53 at the control electrode of the electron tube 45 through a suitable isolating means, such as, for example, a radio frequency choke 55 and a capacitance 57. In like manner, the multi-vibrator 31 also supplies a voltage waveform 59 at the control electrode of the electron tube 47 through suitable isolating means such as a radio frequency choke 61 and a capacitance 63. Both the anode of electron tube 45 and the anode of electron tube 47 are adapted to be connected to a source of positive potential by means of terminals 65 and 67, respectively. A grid leak resistance 69 is connected between the grid and the cathode of electron tube 45, and similarly another grid leak resistance 71 is connected between the grid and cathode of electron tube 47. Both the cathode of electron tube 45 and the cathode of electron tube 47 are connected to a common connection 73. A cathode resistance 75 is connected between common connection 73 and ground reference potential 79. Suitable isolating means between the electronic switch 35 and the heterodyne mixer 37 may be provided by means of a capacitance 77. The overall action of the electronic switch 35 is to apply to the heterodyne mixer 37, alternately a wave of reference frequency and a wave of three times reference frequency. The rate of alternation will depend upon the rate at which the multi-vibrator 31 renders electron tubes 45 and 47 conducting and non-conducting. One suitable rate of alternation has been found to be equal to field rate.

The heterodyne mixer 37 includes two electron tubes 80 and 81. These tubes are preferably identical, and may include at least a cathode, two control electrodes, and an anode. The type shown in the specific circuitry of the drawing, also includes a shield grid positioned between the first and second control electrodes, a suppressor grid, and a screen grid. These grids are included to reduce the capacitive coupling between the elements of the electron tube. The screen grid may be connected to the shield grid internally, and may be externally connected to a terminal adapted to be connected to a suitable source of positive potential. Thus the screen grid and shield grid of electron tube 80 are connected to a terminal 82 which is adapted to be connected to a suitable source of positive potential, and the screen grid and shield grid of electron tube 81 are connected to a terminal 84 which is adapted to be connected to a suitable source of positive potential. The suppressor grid of the electron tube 80 may be connected to the cathode of the electron tube 80, and in like manner the suppressor grid of the electron tube 81 may be connected to the cathode of the electron tube 81.

The output of the electronic switch 35 is connected directly to the second control electrode of electron tube 81, by means of the aforementioned capacitance 77. Also connected to the second control electrode of electron tube 81 is a resistance 83. The second control electrode of electron tube 80 is connected to the second control electrode of electron tube 81 through an inductance 85. Alternately, a wave of reference frequency and a wave of three times reference frequency is applied directly to the second control electrode of electron tube 81. The inductance 85 is of a suitable value of provide a 180° phase shift between the second electrode of electron tube 81 and the second electrode of electron tube 80 at the reference frequency. Therefore, for a purpose to be described later, when the electronic switch 35 is in the proper position to supply a wave of reference frequency, the wave applied to the second electrode of electron tube 80 will be 180° out of phase with respect to the wave applied to the second control electrode of electron tube 81.

The first control electrode of electron tube 80 and the first control electrode of electron tube 81 are connected together and utilize a common grid resistance 87, which in turn is connected to ground reference potential 79. The modulated double reference frequency wave passed by the bandpass filter 33 is applied to the first control electrodes of electron tube 80 and electron tube 81, respectively, through a suitable isolating means such as a capacitance 89. The cathode of electron tube 80 is connected to ground reference potential 79, and in like manner the cathode of electron tube 81 is connected to ground reference potential 79. Both the anode of electron tube 80 and the anode of electron tube 81 are connected to a common connection 91. A load resistance 93 is connected between the common connection 91 and a terminal 95 which is adapted to be connected to a source of positive potential. Also, the low pass filter 39 is connected to the common connection 91.

The operation of the heterodyne mixer 37 is as follows: When the electronic switch 35 supplies a wave of reference frequency to the second control electrodes of electron tubes 80 and 81 and a modulated wave of twice the reference frequency appears at the first control electrodes of electron tubes 80 and 81, a heterodyning action takes place, in which a modulated wave of reference frequency is applied to the low pass filter 39. Since the low pass filter 39 is designed to pass only frequencies up to and including the reference frequency, components which are above the reference frequency will not be applied to the composite television signal adder 17.

Since the reference frequency wave passed by electronic switch 35 appears on the second control electrodes of the electron tubes 80 and 81, 180° out of phase with respect to each other, no non-modulated reference frequency wave will appear at the output of the heterodyne mixer 37. Thus, when the electronic switch 35 is supplying a wave of reference frequency to the heterodyne mixer 37, all the unwanted products of the heterodyning process are eliminated from the output by means of the low pass filter 39 and the inductance 85. When the electronic switch 35 is supplying a wave of three times reference frequency to the heterodyne mixer 37, the low pass filter 39 alone will function to eliminate all the unwanted components appearing as a result of the heterodyning process, since all the unwanted waves are above the pass band of the low pass filter 39.

It will be recognized that the frequencies of the waves used in the illustrative embodiment may be modified without departing from the spirit of the present invention as long as the frequencies chosen satisfy the relationship, wherein, $(n)f$ equals the frequency of the wave to be modulated, $(n-1)f$ equals one heterodyning frequency, and $(n+1)f$ equals another heterodyning frequency, where $n$ is equal to any integer greater than 1, and $f$ equals any desired frequency, such as, for example, a subcarrier frequency. In such a modification suitable frequency multipliers or dividers may be included in place of the frequency doubler and frequency tripler of the illustrative embodiment to provide waves having suitable frequencies. Also it is to be understood that the specific circuitry and arrangement of parts is an illustrative embodiment of the present invention, and may be modified in many ways without departing from the spirit of the invention as defined in the appended claims.

What is claimed is:

1. Apparatus comprising a source of intelligence signals, a first signal source for producing a subcarrier having a frequency equal to $(n)f$, a first modulating circuit, said first modulating circuit adapted to produce a modulated signal consisting of said subcarrier modulated by said intelligence signals, a second signal source for producing a signal having a frequency equal to $(n+1)f$, and a third signal source for producing a signal having a signal with a frequency equal to $(n-1)f$, a second modulating circuit coupled to said first modulating circuit and said second and third signal sources for modulating said modulated subcarrier alternately with said signal having a frequency equal to $(n-1)f$ and with said signal having a frequency equal to $(n+1)f$, respectively, where $n$ equals an integer greater than one and $f$ equals any desired frequency.

2. Apparatus comprising a source of intelligence signals, a first signal source for producing a subcarrier having a frequency equal to $(n)f$, a first modulating circuit, said first modulating circuit adapted to produce a modulated signal consisting, of said subcarrier modulated by said intelligence signals, a second signal source for producing a signal having a frequency equal to $(n+1)f$, and a third signal source for producing a signal having a signal with a frequency equal to $(n-1)f$, a second modulating circuit coupled to said first modulating circuit and said second and third signal sources for modulating said modulated subcarrier alternately with said signal having a frequency equal to $(n-1)f$ and with said signal having a frequency equal to $(n+1)f$, respectively, where $n$ equals an integer greater than one and $f$ equals any desired frequency, a filter circuit, said filter circuit having a pass band having a predetermined frequency range in the vicinity of the frequency equal to $(n)f$ and coupled to said second modulating circuit whereby signals other than those in said prescribed frequency range are excluded from the output of said second modulating circuit.

3. Apparatus comprising a source of modulating waves, a subcarrier source for providing a subcarrier having twice a prescribed frequency, a first modulating means utilized for modulating said subcarrier with said modulating waves, a first heterodyning wave source having said prescribed frequency, a second heterodyning wave source having three times said prescribed frequency, a second modulating means, said second modulating means coupled to said first modulating means and including switching apparatus coupled to said first heterodyning wave source and said second heterodyning wave source whereby said modulated subcarrier is alternately modulated by heterodyning waves from said first heterodyning signal source and said second heterodyning signal source at a predetermined rate.

4. In a modulation system to yield an intelligence signal modulated wave on a carrier of predetermined frequency, apparatus comprising a source of intelligence signals, a subcarrier generator yielding a subcarrier of twice said predetermined frequency, a modulating means, said modulating means coupled to said source of intelligence signals and said subcarrier generator and employed to yield an output signal consisting of said subcarrier modulated with said intelligence wave, a first signal generator for producing a signal at said predetermined frequency, a second signal generator for producing a signal at three times said predetermined frequency, a signal switching and modulating means, said signal switching and modulating means having an output circuit and coupled between said modulating means and said first and second signal generators, respectively, for alternatively modulating the output signal of said modulating means with the signals produced by said first signal generator and said second signal generator.

5. In a modulation system to yield an intelligence signal modulated wave on a carrier of predetermined frequency, apparatus comprising a source of intelligence signals, a subcarrier generator yielding a subcarrier of twice said predetermined frequency, a modulating means, said modulating means coupled to said source of intelligence signals and said subcarrier generator and employed to yield an output signal consisting of said subcarrier modulated with said intelligence wave, a first signal generator for producing a signal at said predetermined frequency, a second signal generator for producing a signal at three times said predetermined frequency, a signal switching and modulating means, said signal switching and modulating means having an output circuit and coupled between said modulating means and said first and second signal generators, respectively, for alternately modulating the output signal of said modulating means with the signals produced by said first signal generator and said second signal generator, a filter circuit, said filter circuit coupled to the output circuit of said signal switching and modulating means and having a pass band principally in the vicinity of said first predetermined frequency whereby all signals outside of this pass band are excluded.

References Cited in the file of this patent

UNITED STATES PATENTS

| | | |
|---|---|---|
| 2,419,984 | Boothroyd | May 6, 1947 |
| 2,427,191 | Brink | Sept. 9, 1947 |
| 2,460,900 | Newbold | Feb. 8, 1949 |
| 2,461,456 | Usselman | Feb. 8, 1949 |
| 2,558,489 | Kalfaian | June 26, 1951 |